Jan. 29, 1935. A. VAN ROOSENDAEL 1,989,574
KITCHEN UTENSIL
Filed March 15, 1934
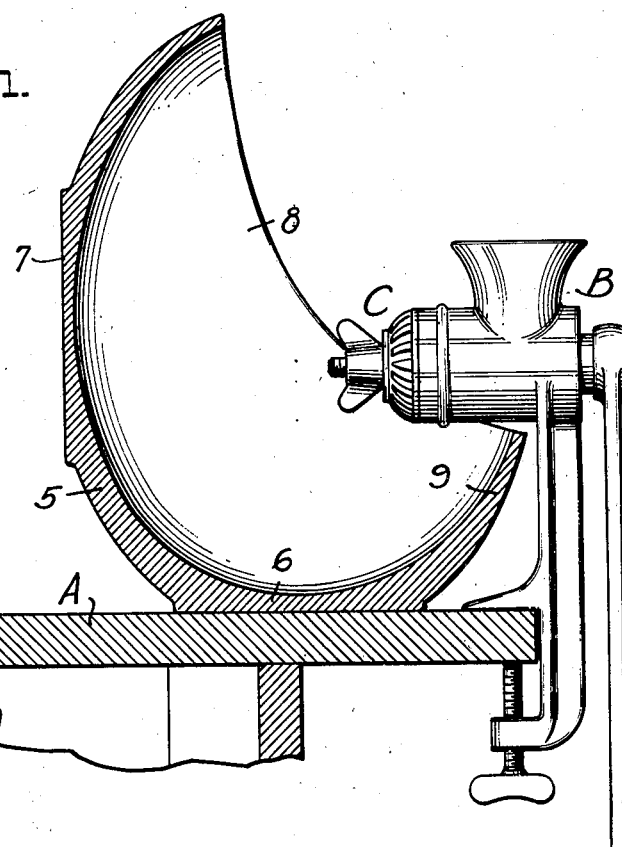
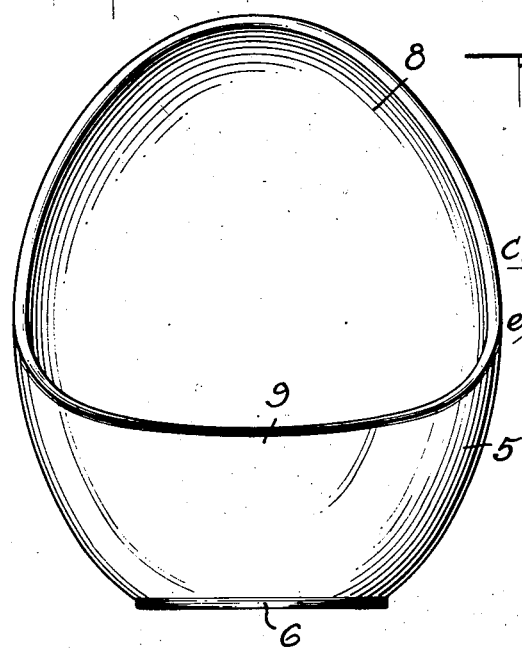
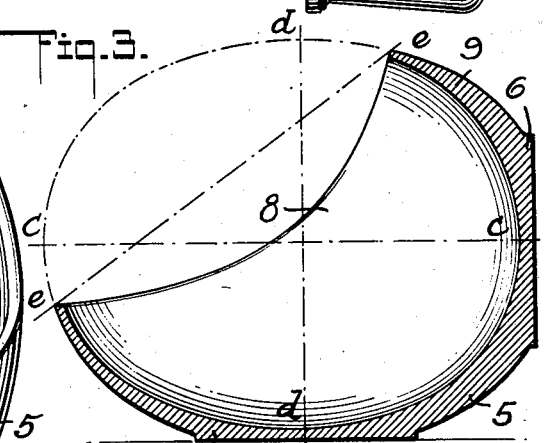
INVENTOR.
AUGUST VAN ROOSENDAEL
BY
ATTORNEYS.

Patented Jan. 29, 1935

1,989,574

UNITED STATES PATENT OFFICE 1,989,574

KITCHEN UTENSIL

August van Roosendael, Los Angeles, Calif.

Application March 15, 1934, Serial No. 715,725

1 Claim. (Cl. 65—15)

My invention relates to the art of culinary, and same is more particularly directed to kitchen utensils.

An object of the invention is to provide a new, novel and useful bowl, the construction of which makes possible use thereof for a number of purposes. In the treatment of food materials or matter preparatory to the cooking thereof, it is frequently required, when following some recipes, that one or more ingredients be first ground and subsequently mixed with certain additional ingredients of food. This usually requires the use of separate utensils, one into which the food may be discharged as it leaves the grinder, and one into which the ground food may be transferred from the first named utensil for the mixing thereof with said other ingredients. Heretofore, the use of separate utensils was required because the common forms of domestic grinders are so designed that they can only be employed in connection with a relatively shallow receptacle whose capacity, as well as the form of the receptacle, is wholly insufficient for the satisfactory handling of the entire mass of matter to be mixed.

It is therefore an important object of the present invention to provide a bowl, the character of which is such that it will satisfactorily function in the dual capacity of (1) a receptacle of large capacity capable of operative association with food grinders of common construction, and (2) a receptacle which will enable a reasonably large amount of other ingredients to be accommodated therein and the whole mass readily mixed in the same bowl and then conveniently poured into a baking or cooking utensil.

It is a further object to so construct the bowl that no matter what intended or selected position it may occupy for a particular use, same will be nicely balanced and the bowl held from tilting or shifting away from such position.

A further object is to provide a bowl, the form of which is prolate spheriod, the same having a single opening into which and from which the food may freely pass, regardless of the working position at which the bowl be placed.

Another object is to provide a bowl the inner contour formation of which is such as will provide a maximum area over which a mixing implement may function with greater ease and efficiency than was heretofore possible.

With the above and other objects in view, which will appear as the nature of the invention is better understood, the same consists in the improved construction and novel arrangements of parts which will hereinafter be fully described and particularly pointed out in the claim.

In the accompanying drawing has been illustrated a single and preferred form of the invention, it being, however, understood that no limitations are necessarily made to the precise structural details therein exhibited, but changes, alterations and modifications within the scope of the claims may be resorted to when desired.

In the drawing:

Figure 1 is a view in longitudinal section through my improved bowl showing same in the position which it occupies when associated with the discharge end of a food grinder, the latter being also illustrated, and same is of a conventional type;

Figure 2 is a view of the bowl looking toward the open side of the bowl; and

Figure 3 is a schematic section of the bowl showing same in a mixing position, i. e., with its long axis horizontally disposed.

A represents a kitchen table to which is removably secured a food grinder B of the well known type, the same having its discharge end C positioned with respect to the top of the table whereby to enable the bowl to be readily associated therewith as desired.

The bowl 5 consists of a hollow, prolate spheroid body, the same constructed of any suitable well known material or composition of matter. I prefer the use of a material the surfaces of which are smooth or glazed, a material that is of light weight and is strong and durable. The form of the bowl is such that it has a long axis $c$—$c$ and a short axis $d$—$d$, the latter lying at right angles to said long axis, and, as illustrated, the bowl is provided at one terminal of the long axis with a flat supporting base 6 and a similar flat supporting base 7 at one terminal of the said short axis $d$—$d$. In view of the relationship of the said bases to each other, it follows that when the base 6 is placed flatwise upon the table A, the long axis $c$—$c$ is vertically disposed as shown in Figures 1 and 2, and that when the base 7 rests upon the table or upon some other flat support, the said long axis will be horizontally disposed.

Formed in the bowl is a large substantially ovate opening 8, and on reference to Figure 3, it will be noted that a straight line $e$—$e$ which passes through the long axis of said opening intersects both the long and short axes $c$—$c$ and $d$—$d$ of said bowl, and incident thereto the connecting ends of the oval which describes the said opening are positioned laterally of the axial lines $c$—$c$ and $d$—$d$. By reason of this arrangement, the side walls of the opening curve gradually from a point at one side of said line c—c to a point at one side of the line d—d in order that a short wall structure 9 will be formed, thus permitting the bowl to be operatively associated with the grinder B. The remainder of the bowl structure is effectively positioned in advance of the said discharge end and on reference to Figure 1, it will be appreciated that the bowl is so proportioned with respect to the size of the grinder B that the material as it discharges from the grinder may gradually pile up in the bowl without fear of displacement of same through said opening. After the bowl has been supplied with the requisite quantity of ground material, it may be withdrawn from under the discharge end C of the grinder and placed in the position shown in Figure 3. Other food ingredients may now be placed in the bowl and readily and very thoroughly mixed with the previously ground matter. Due to the smoothness of the inner walls of the bowl and the great internal area and general contour of the bowl, any well known form of beater or mixing implement may be effectively operated within the bowl and rapid and thorough agitation of the several ingredients effected.

A bowl constructed as herein described is of light weight and may therefore be easily handled; same is fully capable of functioning in the dual capacity referred to; and due to the relationship of the bases 6 and 7 to each other and the unusual or distinctive shape of the bowl, the latter, as stated, is exceptionally well balanced, and whether in the position shown in Figure 3 or the position shown in Figure 1, the bowl cannot be easily overbalanced in the ordinary use thereof. During the process of mixing matter in the bowl, the walls of the bowl function to prevent splashings from escaping through the opening 8, and because of the size and general formation of said opening convenient access may be had to the interior of the bowl when manipulating a mixing implement therein.

I claim:

A food receiving and mixing bowl for use in connection with food grinders of the class adapted to be mounted upon a kitchen table and employing a horizontally disposed rotary food feeding means and a coacting, fixed grinding element from which the ground food can freely discharge, comprising a hollow prolate spheroid body, and a flat horizontally disposed supporting base situated at one terminal of the long axis of the body; the body having a substantially ovate opening of a size to provide a short wall section at one side of said body, the same adapted, when the base is supported on the table and the bowl adjusted to one position relatively of the grinder to extend under the grinder and to occupy a position to enable the fixed grinding element to project laterally into the bowl, and a long wall adapted to be positioned in front of the fixed grinding element to provide a guard to allow the food to pile up in the bowl during the grinding operation and prevent same from overflowing the bowl.

AUGUST van ROOSENDAEL.